United States Patent
Ash et al.

(10) Patent No.: US 10,065,257 B2
(45) Date of Patent: Sep. 4, 2018

(54) WELDING SYSTEM WITH CONTROLLED WIRE FEED SPEED DURING ARC INITIATION

(75) Inventors: Elliott Ash, Cleveland, OH (US); William Matthews, Chesterland, OH (US); James E. Hearn, Brunswick, OH (US)

(73) Assignee: Lincoln Global, Inc., City of Industry, CA (US)

( * ) Notice: Subject to any disclaimer, the term of this patent is extended or adjusted under 35 U.S.C. 154(b) by 2045 days.

(21) Appl. No.: 13/167,184

(22) Filed: Jun. 23, 2011

(65) Prior Publication Data

US 2012/0325791 A1 Dec. 27, 2012

(51) Int. Cl.
*B23K 9/10* (2006.01)
*B23K 9/067* (2006.01)
*B23K 9/095* (2006.01)

(52) U.S. Cl.
CPC ............ *B23K 9/067* (2013.01); *B23K 9/0953* (2013.01); *B23K 9/0956* (2013.01)

(58) Field of Classification Search
CPC .... B23K 9/067; B23K 9/0953; B23K 9/0956; B23K 9/124; B23K 9/125
USPC ............................. 219/130.21, 137.7, 137.71
See application file for complete search history.

(56) References Cited

U.S. PATENT DOCUMENTS

| | | | |
|---|---|---|---|
| 3,509,314 A * | 4/1970 | Freytag | 219/137.71 |
| 3,906,184 A | 9/1975 | Gibbs et al. | |
| 3,978,311 A | 8/1976 | Toth | |
| 4,441,009 A | 4/1984 | Toohey | |
| 4,546,234 A | 10/1985 | Ogasawara et al. | |
| 4,560,857 A | 12/1985 | Segawa et al. | |
| 4,594,498 A | 6/1986 | Ueguri et al. | |
| 4,766,286 A | 8/1988 | Iceland | |
| 5,786,558 A | 7/1998 | Shimada | |
| 6,087,627 A * | 7/2000 | Kramer | 219/130.21 |
| 6,130,407 A | 10/2000 | Villafuerte | |
| 6,180,910 B1 | 1/2001 | Derby, Jr. | |
| 6,498,321 B1 | 12/2002 | Fulmer et al. | |
| 6,548,783 B1 | 4/2003 | Kilovsky et al. | |
| 7,105,777 B2 | 9/2006 | Stava et al. | |
| 7,138,601 B2 | 11/2006 | Uecker | |
| 7,323,659 B2 | 1/2008 | Ihde et al. | |
| 7,700,893 B2 | 4/2010 | Kaufman | |

(Continued)

FOREIGN PATENT DOCUMENTS

CN 2596401 12/2003
CN 101269433 9/2008
(Continued)

OTHER PUBLICATIONS

PCT/ISA/220 dated Nov. 9, 2012, PCT/IB2012/001243.
Decision to Refuse for JP 2015-237569, dated May 16, 2017.

*Primary Examiner* — Eric Stapleton
(74) *Attorney, Agent, or Firm* — Hahn Loeser & Parks LLP

(57) ABSTRACT

A welding system including a power supply, a torch electrically connected to said power supply, a wire feeder that provides a welding consumable to the torch, a controller that communicates with a motor associated the wire feeder and the power supply. The controller obtains a wire feed speed of said motor as it accelerates from a run-in speed to a pre-set speed and controls the power supplied to the torch based on this wire feed speed to reduce stubbing or spattering during arc initiation.

18 Claims, 2 Drawing Sheets

(56) References Cited

U.S. PATENT DOCUMENTS

| | | | |
|---|---|---|---|
| 7,705,527 | B2 | 4/2010 | Norrish |
| 2002/0011474 | A1* | 1/2002 | Sasano .................... 219/137.71 |
| 2006/0131291 | A1 | 6/2006 | Kaufman et al. |
| 2006/0201923 | A1 | 9/2006 | Hutchison |
| 2007/0119841 | A1 | 5/2007 | Nakata et al. |
| 2007/0181553 | A1 | 8/2007 | Stanzel et al. |
| 2010/0200553 | A1 | 8/2010 | Yamazaki et al. |
| 2011/0042365 | A1 | 2/2011 | Hiraoka et al. |
| 2012/0325791 | A1 | 12/2012 | Ash et al. |

FOREIGN PATENT DOCUMENTS

| | | |
|---|---|---|
| CN | 101780586 | 7/2010 |
| EP | 0049037 | 4/1982 |
| EP | 2269758 | 1/2011 |
| JP | 3155468 | 7/1991 |
| JP | 07-178551 | 7/1995 |
| JP | 8155654 | 6/1996 |
| JP | 10094885 | 4/1998 |
| JP | H10-137935 | 5/1998 |
| JP | 11058006 | 3/1999 |
| JP | 2003181641 | 7/2003 |
| JP | 2003311405 | 11/2003 |
| JP | 2006116565 | 5/2006 |
| JP | 2007015122 | 1/2007 |
| JP | 2009101370 | 5/2009 |
| WO | 2006120758 | 11/2006 |
| WO | 2007092107 | 8/2007 |
| WO | 2010146844 | 12/2010 |
| WO | 2012176057 A1 | 12/2012 |

* cited by examiner

WELDING SYSTEM WITH CONTROLLED WIRE FEED SPEED DURING ARC INITIATION

TECHNICAL FIELD

Certain embodiments relate to a welding system having controlled wire feed speed during arc initiation to improve starting of the weld. More particularly, certain embodiments relate to a system, apparatus and method for starting a welding process to a controller that controls the motor to produce a known acceleration and adjusts the arc based on the motor acceleration and actual wire feed speed during start up.

BACKGROUND

In an arc welding process, there is an initial start up phase or arc initiation phase where the wire feeder motor accelerates from a run in speed to a desired steady state wire feed speed. On some occasions the motor may start from a complete stop such that the run-in speed is zero. In accelerating to the desired wire feed speed, the motor speed ramps upward from the run in speed toward the desired wire feed speed. Typically the motor will briefly overshoot the desired wire feed speed. As a result, the arc, which is keyed to the desired wire feed speed, will often be overpowered as the motor ramps up or under powered when the motor overshoots the wire feed speed. The practical effect is that when the arc is overpowered, the arc creates spattering of the weld material. When underpowered relative to the wire feed speed, wire stubbing may occur. Both of these lead to imperfections in the appearance and potentially the quality of the weld during arc initiation. Once the welding system reaches steady state and is operating at the desired wire feed speed, coordination between the arc and the wire feed speed is generally well controlled, and the practical issues of spatter and stubbing seen during initiation are a much less likely to occur.

Relative to the steady state operation of the welding system, the arc initiation phase is short, and may last less than 14 milliseconds. This time period is provided as an example, and should not be considered limiting as it is expected that the length of the arc initiation phase may vary depending on the welding machine and application. Nevertheless, it is desirable to create a high quality weld with a consistent appearance as soon as possible. Ideally, the arc and wire feed motor will be synchronized during arc initiation to produce a flawless weld throughout the entire welding process.

SUMMARY

In general, the present invention provides a welding system that includes a power supply, a welding torch powered by the power supply, and a wire feeder that provides a welding consumable to the torch. The welding system also includes a controller that is connected to the wire feeder and the power supply. The controller obtains a wire feed speed from the wire feeder motor as it accelerates from a run-in speed to a pre-set speed and controls the power supplied to the torch based on this wire feed speed to reduce stubbing or spattering during arc initiation.

The present invention further provides a welding system including a power supply, a torch electrically connected to the power supply, and a wire feeder having a motor. The wire feeder provides a welding consumable to the torch, and is connected to a controller that is also connected to the power supply. The controller of this system includes means for obtaining a wire feed speed from the motor as it accelerates from a run-in speed to a pre-set wire feed speed; and means for correlating the power output from the power supply based on the wire feed speed. The means for correlating receives wire speed information from the means for obtaining the wire feed speed, such that as the motor accelerates, the means for correlating signals the power supply to generate a selected power output to the torch based on the wire feed speed.

In accordance with one embodiment of the invention, the means for obtaining the wire feed speed as the motor accelerates includes determining the wire feed speed from feedback from the motor. In one example, feedback from the motor may be obtained from a sensor that monitors the motor speed or speed of a roller used to feed the wire. The sensor may be any speed sensor available in the art including, for example, an encoder. Alternatively, if a servo-motor is used, this information may be obtained directly from the servo-motor. According to another embodiment of the invention, when the motor is accelerated at a known rate, the means for obtaining the wire feed speed includes calculating the wire feed speed as a function of time and the known rate of acceleration. To that end, in accordance with other embodiments of the invention, the means for obtaining may include a processor or circuit capable of performing this calculation. In one embodiment, an integration circuit is used.

In accordance with one embodiment of the invention, the means for correlating includes a data structure that stores a selected power output, such as current or voltage, for a given wire feed speed obtained by the controller. According to another embodiment of the invention, the data structure includes a look up table with plural power outputs each corresponding to a different wire feed speed, such that the controller generates a selected power output from the look up table based on the wire feed speed obtained by the controller.

The present invention still further provides a method of controlling an arc generated by the torch during arc initiation. The method includes obtaining a wire feed speed as the motor of the wire feeder accelerates, during the arc initiation, and correlating the output of the power supply based on the wire feed speed to melt and apply the consumable during arc initiation without stubbing or spattering.

These and other features of the claimed invention, as well as details of illustrated embodiments thereof, will be more fully understood from the following description and drawings.

DETAILED DESCRIPTION

Figure 1:
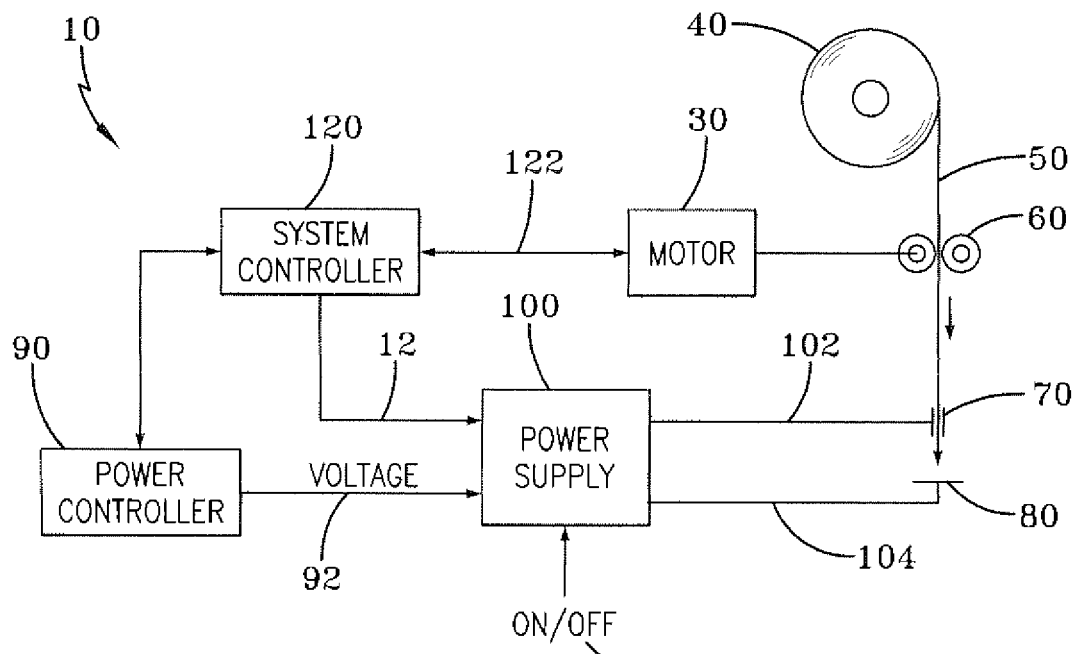
FIG. 1 is a schematic block diagram of one embodiment of a welding system according to the concepts of the present invention.

The embodiments described herein relate to a method, apparatus, and/or system that improves weld quality during arc initiation. Arc initiation is the period of time between run in of the welding consumable and the steady state welding process. The arc initiation period typically starts when the arc is established by the welder. This period is characterized by the welding consumable being accelerated from the run in speed, which may be zero, to the desired steady state welding speed for a given welding process. The desired wire feed speed for the process may be established by the user or a controller. Typically, the run-in speed is slower than the desired speed, but it is possible that the motor may need to decelerate to obtain the desired speed, and therefore, the rate of acceleration may be negative rather than positive. For sake of simplicity, use of the term acceleration will be understood as referring to acceleration or deceleration, and therefore, is not limiting. Likewise, although the example of arc initiation is discussed, other periods may involve changes in the wire feed speed, and the present invention would apply equally to these periods as well. Therefore, reference to the arc initiation period is one example, and should not be considered limiting. The embodiments for improving weld quality during this period will be described in connection with a welding system used in an arc welding process. The arc welding system applies a current between a welding torch and a work piece to liquefy a welding consumable and deposit molten welding material on the work piece to form a weld. The welding consumable or electrode may be any welding consumable, but for sake of simplicity, reference will be made to a welding wire throughout this description including references to the speed of the consumable as being a "wire feed speed." These references, however, should not be considered limiting.

The welding system according to the concepts of the present invention may be used in connection with a variety of welding processes including, for example MIG welding or TIG welding. These examples are not to be considered limiting and only general reference to a welding system will be made herein. In general, the welding system may include a welding power supply that includes a wire feeder, a power source, a torch or gun, a wire feeder controller, and a power source controller coordinating these components. The welding system components may be provided in a single housing or encased in separate housings. The power supply may include the power circuitry of the welder (e.g., rectifiers, switches, transformers, SCRS, etc.) that process and provide the output power of the welding power supply. The power source controller of the welding power supply may include digital and/or analog circuitry, discreet and/or integrated circuitry, microprocessors, DSPS, etc., software, hardware, and/or firmware which are used to control a welding process, or a device such as a power source and/or the wire feeder.

To facilitate operation, the user controls for the welding system may be limited to one control for the arc voltage and another control for wire feed speed. Additional controls may be provided to allow the user to more precisely control the welding process during a steady state operation. The level of control provided to the user may depend on the particular application and the desirability of automated welding that is virtually hands free for the user. Since the present invention addresses weld quality during the arc initiation phase, the level of control during the steady state welding process and user input are not limiting and any level of user control during that process may be used in conjunction with the system of the present invention.

Welding system 10 according to one embodiment of the present invention is schematically shown in FIG. 1 and includes power supply 100 connected to welding torch 70 used to deliver welding wire 50 toward work piece 80 and generate an arc to melt wire 70 and distribute it to work piece 80. The welding wire or electrode may be a solid or cored electrode and may be constructed of any material suitable for a given welding application. In the example electrode used to generate FIGS. 2-3, a solid low carbon wire was used. The diameter of the wire may vary according to the given application. In the examples, the wire had a diameter of about 0.035 inch. As noted, the composition, type, and diameter of the welding wire may be selected for a particular welding operation or to suit a particular type of work piece. The characteristics of the electrode are not limiting in the context of the present invention.

Power supply 100 may be of any type commonly used in the art and may be designed to generate suitable voltages for a given welding application. Typical welding power supplies are capable of generating voltages of 120 or 240 and may supply any type of current wave form depending on a particular welding application. Power source 100 may be provided with on/off switch 110 to activate and deactivate the power supply of the arc welder or torch 70. Power supply 100 may condition power supplied from a utility or engine driven power supply to produce output power usable by the welding process. To that end, power supply 100 may include one or more transformer assemblies or power conditioners (not shown) and be controlled by power supply controller 90 that regulates the output side of the power conditioning components. Negative terminal 104 of power supply 100 may be connected by a clamp or other means to work piece 80 with positive terminal 102 being connected to torch 70 to generate an arc between torch 70 and work piece 80.

The system may include a wire feeder to supply welding wire to the torch. The wire feeder may be an internal wire feeder attached to torch 70. Alternatively, an external wire feeder, which is not attached to torch 70 may be used. Wire supply 40 may be provided within wire feeder 60 or welding wire 50 may be drawn into feeder 60. The type of supply may depend on the type of consumable used. In the example illustrated in FIG. 1, wire supply 40 includes a spool or drum containing welding wire. Wire feeder 60 may include a pair of rollers used to draw wire 50 from wire supply 40 and feed it to torch 70. At least one roller is rotated by operation of motor 30.

In the embodiment shown, wire feeder 60 includes motor 30 that can push or pull wire 50 such that the position of wire 50 relative to work piece 80 may be adjusted during operation. The push-pull of wire 50 is accomplished by changing the direction of rotation of one or more of the rollers. This may be accomplished at the rollers through a gearing, belts, or similar devices, or by changing the direction of rotation at motor 30. In the example shown, motor 30 is a servo-controlled motor.

Figure 3:
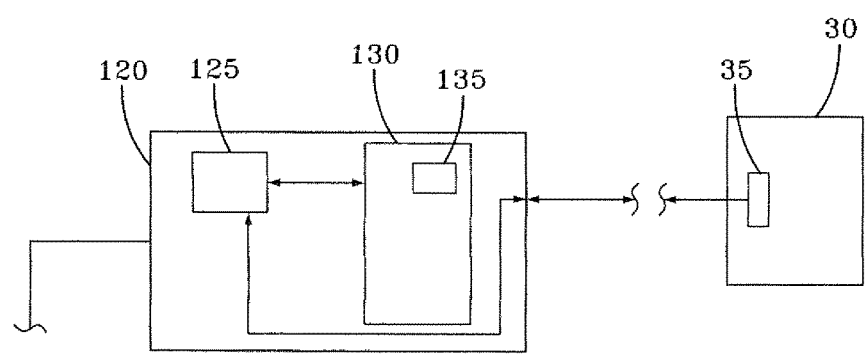
FIG. 3 is a schematic block diagram of a system controller and motor according to the concepts of the present invention.

Welding system includes system controller 120 which may be a standalone unit or be integrated with a component of the system housed with the other components of the system. Controller 120 may be powered by the same power supply as that for the welding system, or have a separate power supply. Controller 120 is in communication with motor 30 to receive a signal from motor indicative of the actual wire feed speed. Controller 120 may also communicate with motor 30 to control the motor's operation. Communication between controller 120 and motor 30 may be conducted over a wired or wireless connection 122. In the example shown, to move from the run in speed to the desired wire feed speed (pre-set), controller 120 may send a signal to motor 30 that causes the motor 30 to accelerate at a known rate. As depicted in FIG. 3, this rate may be a constant rate such that the change in wire feed speed from run-in to the pre-set wire feed speed is nearly linear, as described more completely below.

The pre-set or desired steady state wire feed speed is known and may be established as a work point in the controller 120. To obtain that pre-set wire feed speed, motor 30 must accelerate from the run in speed to the pre-set wire feed speed. This typically results in some overshoot of the desired wire feed speed by the motor as it accelerates. The acceleration characteristics of the motor often vary from motor to motor such that the rate of acceleration and amount of over shoot cannot be adequately predicted. Consequently, the quality of the weld may suffer.

Figure 2:
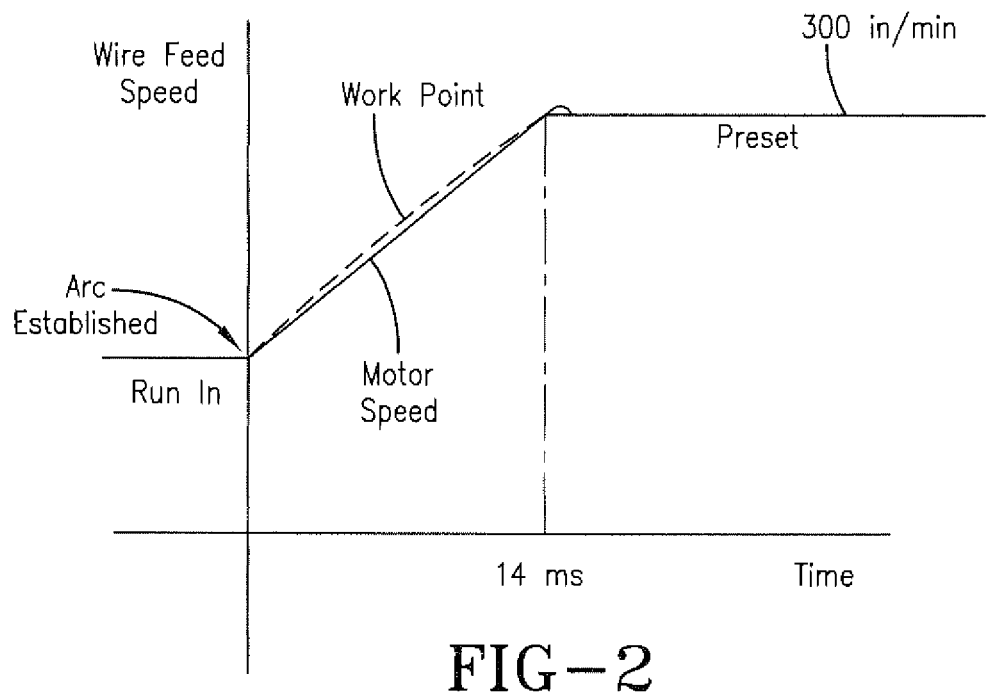
FIG. 2 is a plot of wire feel speed versus time for a welding system according to the concepts of the present invention.

As best shown in FIG. 2, the welding system of the present invention improves the quality of the weld during arc initiation by establishing an arc work point (dashed line) that more closely relates to the actual wire feed speed during arc initiation. To achieve better correlation between the work point value for the arc and the actual wire feed speed during arc initiation, according to one embodiment of the present invention, feedback from motor 30 is used to determine the actual wire feed speed and supply the actual wire feed speed to controller 120. Using the actual wire feed speed at a given instant during the arc initiation process, a work point value for the arc is selected. The work point values for each wire feed speed may be stored in memory within controller 120. In one embodiment, described more completely below, the memory within controller 120 includes a look up table to determine the output signal from controller 120 establishing the arc voltage based on the wire feed speed detected at motor 30. Feed speed from the motor 30 may be provided by speed sensor 35 that monitors the motor speed. Speed sensor 35 may be any suitable sensor including, for example, an encoder keyed to the drive shaft of motor 30. To the extent that the speed of the wire differs from the speed of motor 30, the proportionate difference may be accounted for by speed sensor 35 or programmed into controller 120. In this way, sensor 35 provides feedback from motor 30.

According to another embodiment of the present invention, controller 120 provides a signal to motor 30 to accelerate the motor from a run-in speed to the pre-set wire feed speed at a known ramp rate. As shown in FIG. 2, controller 120 may provide a constant ramp rate such that motor 30 exhibits a linear increase in the wire feed speed from run-in to the pre-set wire feed speed. To correlate the arc to the wire feed speed during arc initiation, the known ramp rate may be used to determine actual wire feed speed for a given time during the arc initiation period. To that end, integration of the known acceleration may be performed to provide an actual wire feed speed. As in the previous embodiment, controller 120 may include a work point value for the arc voltage for each corresponding wire feed speed during the arc initiation, and an arc voltage signal may be sent from the controller corresponding to the actual wire feed speed or known ramp rate.

In either of these embodiments, to further improve arc initiation, controller 120 may establish the run in speed. To that end, controller 120 may establish a slower run in speed to allow better correlation with the detected wire feed speed. Alternatively, using a known run-in speed facilitates calculation of the ramp rate from the run-in speed to the pre-set wire feed speed. Acceleration of motor 30 may be controlled to be at a rate less than the full acceleration capability of motor 30.

In one embodiment, controller 120 includes a work point look up table establishing a current or voltage (as shown) delivered to the torch corresponding to a wire feed speed. As discussed above, feedback from motor 30 may be used to determine the actual wire feed speed or when motor 30 is accelerated at a known rate, integration may be performed to establish the wire feed speed and provide that information to determine the appropriate voltage from the look up table. To that end, controller 120 may be provided with processor 125 (FIG. 3) or other component, such as, an integrating circuit, that performs this calculation. Controller 120 may also include memory 130 that stores current or voltage values used to generate a selected arc for a given wire feed speed. These values may be stored in any manner. In the example shown, a selected power output for a given wire feed speed is stored as a work point. The arc work-point and corresponding wire feed speed values may be stored in a look up table or other data structure 135. Upon receiving an actual wire feed speed from motor 30 or upon calculating an instantaneous wire feed speed from the motor's acceleration, the work point value is updated and the arc voltage controlled based on the wire feed speed to correlate these values in real time. By correlating the arc to the actual wire feed speed, better synchronization of the arc is achieved during arc initiation, reducing the likelihood of splatter or stubbing.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

What is claimed is:

1. A welding system comprising:
a power supply;
a torch electrically connected to said power supply;
a wire feeder having a motor, said wire feeder providing a welding consumable to said torch;
a controller, said controller being in communication with said motor and said power supply;
wherein said controller obtains a wire feed speed of said motor during arc initiation as it accelerates from a run-in speed to a pre-set speed and controls the power supplied to the torch based on said wire feed speed.

2. The welding system of claim 1, wherein said controller obtains said wire feed speed from feedback from said motor.

3. The welding system of claim 1, wherein said controller accelerates said motor from a run-in speed to a pre-set speed at a known rate, and calculates said wire feed speed as the motor accelerates from the run-in speed to the pre-set speed from said known rate.

4. The welding system of claim 1, wherein said controller operates said motor at a known run-in speed.

5. The welding system of claim 4, wherein said known run-in speed is no greater than about 30 inches per minute.

6. The welding system of claim 1, wherein said motor is a servo-motor.

7. The welding system of claim 1, wherein said wire feeder is adapted to advance and retract a welding consumable.

8. The welding system of claim 1, wherein said welding consumable is a welding wire.

9. The welding system of claim 1, wherein said pre-set speed is at least about 300 inches per minute.

10. The welding system of claim 1, wherein said controller obtains said wire feed speed of said motor as it accelerates in real time.

11. The welding system of claim 1 wherein said controller includes a memory storing plural voltages or currents corresponding to plural wire feed speeds, wherein said controller outputs one of said plural voltages or currents to said torch based on said wire feed speed of said motor.

12. The welding system of claim 1, wherein said controller includes a work point look up table containing sets of two or more welding parameters associated with a plurality of welding waveforms that assigns one of the sets of two or more welding parameters associated with one of the plurality of welding waveforms to said torch based on a wire feed speed obtained by said controller from said motor said two or more welding parameters including at least wire feed speed and one of current or voltage.

13. The welding system of claim 12, wherein said work point look up table assigns a voltage or a current to be output to said torch based on said wire feed speed obtained by said controller from said motor.

14. In a welding system comprising a power supply, a torch electrically connected to said power supply, a wire feeder having a motor, said wire feeder providing a welding consumable to said torch, and a controller in communication with said wire feeder and said power supply, the controller comprising:

means for obtaining a wire feed speed from said motor during arc initiation as it accelerates from a run-in speed to a pre-set wire feed speed; and means for correlating a power output from the power supply, said means for correlating being in communication with the power supply, the torch and said means for obtaining said wire feed speed, wherein as the motor accelerates, said means for correlating communicates with said means for obtaining and said power supply to generate a selected power output to said torch based on said wire feed speed.

15. The welding system of claim 14, wherein said means for obtaining a wire feed speed includes a sensor measuring actual wire feed speed as said motor accelerates.

16. The welding system of claim 14, wherein said controller is in communication with said motor and controls acceleration of said motor from said run-in speed to said pre-set wire feed speed at a known rate, and wherein said means for obtaining a wire feed speed includes means for calculating said wire feed speed from said known rate.

17. The welding system of claim 16, wherein said means for calculating includes an integrating circuit that calculates wire feed speed by integrating said known rate of acceleration.

18. The welding system of claim 14, wherein said means for obtaining said wire feed speed as said motor accelerates from said run-in speed to said pre-set speed obtains said wire feed speed in real time.

* * * * *